Aug. 25, 1936.  V. G. W. GILBERT  2,051,841
FOAM PRODUCTION
Filed June 8, 1933
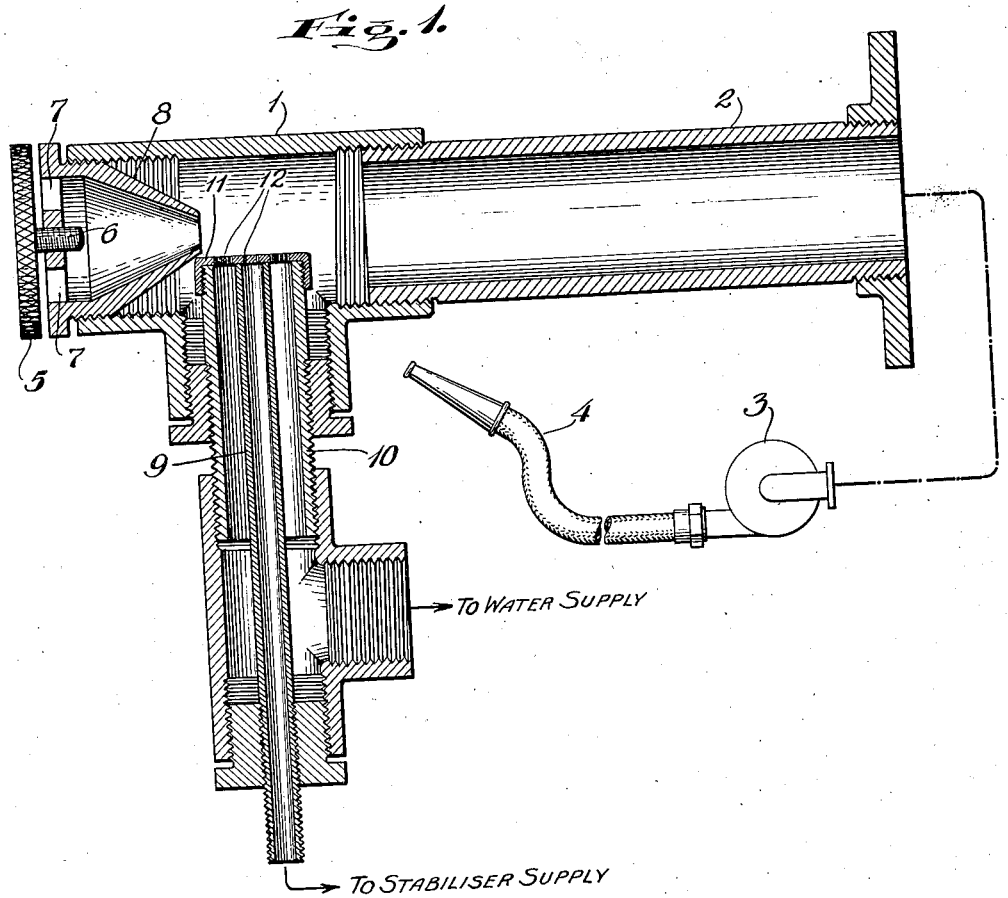
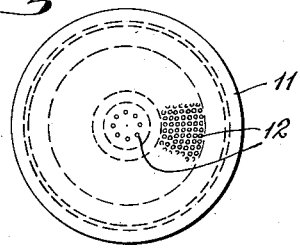
Victor. G. W. Gilbert
INVENTOR.
BY Jeffery Kimball & Eggleston
ATTORNEYS.

Patented Aug. 25, 1936

2,051,841

UNITED STATES PATENT OFFICE 2,051,841

FOAM PRODUCTION

Victor George William Gilbert, London, England, assignor, by mesne assignments, to American-La France-Foamite Corporation, a corporation of New York Application June 8, 1933, Serial No. 674,868
In Great Britain June 10, 1932

3 Claims. (Cl. 261—28)

The object of the invention is the preparation of mechanically produced or so-called "air" foam by a method and apparatus in which the gaseous and liquid ingredients are quickly and efficiently converted into foam without requiring to be beaten or otherwise treated as heretofore, and is accomplished by introducing the said ingredients into a mixing chamber, and so commingling them, while maintaining the chamber under suction, that the foam is produced therein ready for immediate discharge onto the fire by suitable pump, which latter comprises also the source of the suction applied to the mixing chamber.

A preferred form of the invention is shown, partly in section and partly in diagram, in Fig. 1 of the accompanying drawing, Fig. 2 being a detail.

The body of the foam producer unit consists of a mixing chamber 1 into which the ingredients are admitted as below described and which is shown as a T-pipe having an extension 2 connected to the intake side of a rotary pump 3, preferably of the vane type, which serves to maintain the chamber under suction and to deliver the foam through a discharge line 4.

The gaseous ingredient, which is air in this case, is admitted to the mixing chamber through a controlled port in the end of the T-pipe remote from the extension 2, the head 5 of screw 6 serving to vary the flow through orifices 7 whence the air preferably discharges into the chamber through a converging nozzle 8, whereby its velocity is increased.

The air and liquid streams are arranged transversely of each other and to this end the latter are admitted by way of the lateral branch of the T end conveniently through the concentric pipes 9 and 10, which are connected respectively to sources of supply of foam stabilizer and water. The ends of these pipes within the mixing chamber are so located as to discharge the liquid ingredients therein adjacent the air nozzle, the pump-induced flow from the latter sweeping across the path of the liquids and immediately expanding them into foam.

The admission of the liquid ingredients to the mixing chamber, whether from separate sources of supply as indicated or pre-mixed is also subject to control or may be predetermined as to quantity by the size of the inlets, this being accomplished in the form shown by means of a cap 11 closing the ends of pipes 9 and 10 and having a number of small holes 12 (the outer ones of $\frac{1}{32}''$ and the inner $\frac{1}{16}''$ bore) through which the water and stabilizer are metered in the required proportions and discharges in a series of jets. Highly satisfactory results are obtained by constituting the foam of 90% air, 9.8% water and 0.2% saponine.

As above described, the foam is produced before reaching the pump and by the physical action of the suction induced air stream on the liquid ingredients, the sources of supply of which may be at a slight head above cap 11 to insure more immediate and thorough mingling of the streams.

I claim:

1. Foam producing apparatus comprising the combination of a mixing chamber, a plurality of jet-forming inlets to the chamber connected to a source of supply of water and foam stabilizer and predetermined to meter the liquid ingredients into the mixing chamber in the required proportions, means for admitting air into the chamber transversely of and into the liquid jets and a pump connected to withdrawn and discharge the air and liquid ingredients entering said chamber, thereby maintaining the same under suction.

2. Foam producing apparatus comprising a delivery pump, a mixing chamber connected to the intake thereof, means for introducing a plurality of fine streams of foam forming liquid into said chamber under the suction of the pump, and an air admission port through which air is drawn into said chamber by the pump suction, said port located to direct the entering air across said streams of liquid.

3. Foam producing apparatus comprising a pump, a mixing chamber connected to the intake thereof and thereby maintained under suction, separate sources of supply of water and a foam forming solution each having a connection to the mixing chamber terminating in an inlet thereto having a plurality of restricted orifices, whereby said water and solution are separately admitted to the chamber in the form of fine streams, and an air inlet to the chamber adapted to admit air thereto in a direction of flow across the paths of said plural liquid streams.

VICTOR GEORGE WILLIAM GILBERT.